(12) United States Patent
Todd et al.

(10) Patent No.: US 8,717,159 B2
(45) Date of Patent: May 6, 2014

(54) VEHICLE BRAKE MONITORING SYSTEM AND METHOD

(76) Inventors: Jamie Bishop Todd, Guelph (CA); Sam Jamison Todd, Guelph (CA); Jerid Allan Leclair, Guelph (CA)

( * ) Notice: Subject to any disclaimer, the term of this patent is extended or adjusted under 35 U.S.C. 154(b) by 173 days.

(21) Appl. No.: 13/048,728

(22) Filed: Mar. 15, 2011

(65) Prior Publication Data
US 2011/0254679 A1 Oct. 20, 2011

Related U.S. Application Data

(60) Provisional application No. 61/314,045, filed on Mar. 15, 2010.

(51) Int. Cl.
*G08B 13/18* (2006.01)

(52) U.S. Cl.
USPC .. 340/454; 340/453; 188/1.11 R; 188/1.11 W

(58) Field of Classification Search
USPC ............ 340/454, 453, 426.32; 73/121; 303/122.03; 188/1.11 R, 1.11 W, 1.11 L, 188/1.11 E
See application file for complete search history.

(56) References Cited

U.S. PATENT DOCUMENTS

| | | | |
|---|---|---|---|
| 3,534,835 A | 10/1970 | Meier | |
| 3,776,329 A | 12/1973 | Hope et al. | |
| 4,186,822 A | 2/1980 | Khuntia et al. | |
| 4,583,071 A | 4/1986 | Sebalos et al. | |
| 4,855,712 A | 8/1989 | Wiley, Jr. et al. | |
| 4,970,496 A | 11/1990 | Kirkpatrick | |
| 5,253,735 A | 10/1993 | Larson et al. | |
| 5,263,556 A | 11/1993 | Frania | |
| 5,285,190 A | 2/1994 | Humphreys et al. | |
| 5,339,069 A | 8/1994 | Penner et al. | |
| 5,358,075 A | 10/1994 | Jarzombek | |
| 5,450,930 A | 9/1995 | Martens et al. | |
| 5,501,305 A | 3/1996 | Stalmeir et al. | |
| 5,632,359 A | 5/1997 | Camps et al. | |
| 5,689,231 A | 11/1997 | Olson | |
| 5,791,441 A | 8/1998 | Matos et al. | |
| 5,812,053 A | 9/1998 | Kovack | |
| 5,825,287 A | 10/1998 | Zarybnicky, Sr. et al. | |
| 5,848,673 A | 12/1998 | Strauss et al. | |
| 5,959,365 A | 9/1999 | Mantini et al. | |
| 6,040,665 A | 3/2000 | Shirai et al. | |
| 6,105,730 A | 8/2000 | Ekeroth | |
| 6,129,183 A | 10/2000 | Ward | |
| 6,257,374 B1 | 7/2001 | Strzelczyk et al. | |
| 6,272,914 B1 | 8/2001 | Ciotti | |
| 6,276,494 B1 | 8/2001 | Ward et al. | |
| 6,310,545 B1 | 10/2001 | Sapir | |

(Continued)

FOREIGN PATENT DOCUMENTS

DE 4212279 A1 10/1993
DE 4409351 A1 9/1995

(Continued)

*Primary Examiner* — Toan N Pham
(74) *Attorney, Agent, or Firm* — Renner Kenner Greive Bobak Taylor & Weber

(57) ABSTRACT

A vehicle brake monitoring system comprises a sensor assembly configured to detect, during vehicle braking, relative position of a longitudinal member contacting a brake pad carrier, and processing structure communicating with the sensor assembly. The processing structure processes output of the sensor assembly to determine brake status.

18 Claims, 18 Drawing Sheets

(56) References Cited

U.S. PATENT DOCUMENTS

| | | |
|---|---|---|
| 6,341,670 B1 * | 1/2002 | Leblanc et al. .......... 188/1.11 L |
| 6,352,137 B1 | 3/2002 | Stegall et al. |
| 6,411,206 B1 | 6/2002 | Weant et al. |
| 6,481,542 B2 | 11/2002 | Giering et al. |
| 6,626,269 B2 | 9/2003 | Shaw et al. |
| 6,820,730 B2 | 11/2004 | Angerfors |
| 7,244,003 B2 * | 7/2007 | Larson .......................... 303/191 |
| 7,322,447 B2 | 1/2008 | Deckhut et al. |
| 7,877,216 B2 * | 1/2011 | Wright et al. ................... 702/34 |
| 2001/0030602 A1 | 10/2001 | Osterman et al. |
| 2001/0042659 A1 | 11/2001 | Kramer |
| 2002/0019688 A1 | 2/2002 | Mantini et al. |
| 2002/0126007 A1 | 9/2002 | Weant et al. |
| 2003/0024773 A1 | 2/2003 | Goncalves et al. |
| 2003/0084714 A1 | 5/2003 | Chang et al. |
| 2005/0212357 A1 * | 9/2005 | Adams ..................... 303/122.03 |
| 2005/0241894 A1 | 11/2005 | Baumgartner et al. |
| 2006/0149440 A1 | 7/2006 | Pettersson et al. |
| 2011/0241866 A1 | 10/2011 | Todd et al. |

FOREIGN PATENT DOCUMENTS

| | | |
|---|---|---|
| DE | 10132968 A1 | 2/2012 |
| EP | 1176330 A2 | 1/2002 |
| GB | 1387807 | 3/1975 |
| WO | 0229274 A1 | 11/2002 |

* cited by examiner

VEHICLE BRAKE MONITORING SYSTEM AND METHOD

CROSS-REFERENCE TO RELATED APPLICATIONS

This application claims the benefit of U.S. Provisional application No. 61/314,045 to Todd et al. entitled, "VEHICLE BRAKE MONITORING SYSTEM AND METHOD", filed Mar. 15, 2010, the content of which is incorporated herein by reference in its entirety.

FIELD OF THE INVENTION

The present invention relates generally to vehicle diagnostics and particularly to a vehicle brake monitoring system and method.

BACKGROUND OF THE INVENTION

Brake-related problems account for over half of all violations that can bring a highway transport vehicle into an out-of-service state during roadside inspections. Brake problems are also a common cause of transport vehicle accidents, and have been cited as a factor in nearly 30% of all truck related accidents by the Commercial Vehicle Safety Association. For owners or operators of these vehicles, brake problems can therefore lead to costly downtime and, in the event of an accident, possible liability and insurance expenses.

In many cases, status of brake systems is assessed during roadside service inspections. For vehicles equipped with certain models of disc brakes that are not equipped with a built-in wear indicator pin, inspection of the brake system typically requires removal of the wheels and disassembly of the brake system. For vehicles equipped with certain models of disc brakes that are equipped with a built-in wear indicator pin, brake system inspection typically involves a visual or manual measurement of the length of the brake wear indicator pin protruding from the caliper housing. However, it is estimated that a large percentage of vehicles that pass this test still have other brake issues that are difficult or impossible to detect without otherwise removing the wheel and/or dismantling the brake system and that warrant an out-of-service violation.

Disc brake monitoring systems are known. For example, U.S. Pat. No. 7,322,447 to Deckhut et al. discloses a disc brake having a brake disc and a brake caliper spanning the brake disc. A brake applicator shaft is supported on the brake caliper and is arranged transversely to an axis of rotation of the brake disc. The brake applicator shaft has a rotary lever for actuating the brake applicator shaft. An adjusting device provided with a thrust spindle having an end face facing away from the brake disc is provided. Upon brake application, the brake applicator shaft transmits a brake force through the thrust spindle onto the brake disc. A monitoring device is provided that has a measuring element moveable relative to the brake caliper and resting against the end face of the thrust spindle.

In-cab vehicle monitoring systems for highway transport vehicles are also known. For example, U.S. Pat. No. 5,959,365 to Mantini et al. discloses an early warning device for tire rims and hub assemblies, comprising one or more individual axle spindle sensors, a programmable microprocessor for receiving and processing the sensor signals to detect an alarm condition, and alarm means to alert the driver of a problem with one or more of the wheels. The sensors are positioned in proximity to the axles and are capable of measuring heat, noise, vibration and/or knocking, which can be indicators of imminent detachment of the tire rim or the wheel hub assembly from the vehicle.

While vehicle disc brake monitoring systems and methods are known, improvements are desired. It is therefore an object of the present invention to provide a novel vehicle brake monitoring system and method.

SUMMARY OF THE INVENTION

Accordingly, in one aspect there is provided a vehicle brake monitoring system comprising:

a sensor assembly configured to detect, during vehicle braking, relative position of a longitudinal member contacting a brake pad carrier; and processing structure communicating with the sensor assembly, the processing structure processing output of the sensor assembly to determine brake status.

In one embodiment, the system further comprises at least one temperature sensor communicating with the processing structure and configured to measure temperature adjacent the brake. In a further embodiment, the temperature sensor is a moveable temperature sensor and is configured to move linearly in response to movement of the carrier, the moveable temperature sensor serving as the longitudinal member. In a still further embodiment, the sensor of the sensor assembly is a linear sensor.

In another embodiment, the longitudinal member is a wear indicator pin. In a further embodiment, the sensor assembly comprises at least one element that is displaced by the longitudinal member during braking, and at least one sensor configured to detect displacement of the element. In a further embodiment, the sensor assembly comprises a paddle to rotate in response to longitudinal movement of the wear indicator pin, and a rotary sensor configured to detect rotation of the paddle.

In another embodiment, the processing structure compares sensor output to previous sensor output to determine at least one of brake wear and brake temperature.

In another aspect, there is provided a vehicle brake monitoring apparatus comprising:

a sensor assembly comprising a sensor for detecting relative position of a longitudinal member contacting a brake pad carrier.

In one embodiment, the apparatus further comprises at least one element that is displaced by the longitudinal member during braking.

In another embodiment, the apparatus further comprises at least one temperature sensor measuring temperature adjacent the brake. In a further embodiment, the temperature sensor is a moveable temperature sensor and is configured to move linearly in response to movement of the carrier, the moveable temperature sensor serving as the longitudinal member. In a still further embodiment, the sensor of the sensor assembly is a linear sensor.

In still another embodiment, the longitudinal member is a wear indicator pin. In a further embodiment, the sensor assembly comprises a paddle configured to rotate in response to movement of the wear indicator pin, and wherein the sensor is a rotary sensor configured to detect rotation of the paddle.

In yet another aspect, there is provided a method of monitoring a vehicle brake, the method comprising:

sensing at least one relative position of a longitudinal member contacting a brake pad carrier;

communicating the at least one relative position to processing structure; and comparing the at least one relative position to previous relative position data to determine brake status.

In one embodiment, the method further comprises:
sensing temperature adjacent the brake; and
communicating the temperature to the processing structure.

In another embodiment, the longitudinal member is a wear indicator pin. In a further embodiment, the at least one relative position comprises a rotational position of a paddle configured to rotate relative to a rotary sensor and in response to movement of the wear indicator pin.

In another embodiment, the temperature sensor is a moveable temperature sensor functioning as the longitudinal member, and the at least one relative position is a linear position of the moveable temperature sensor.

In another embodiment, the method further comprises displaying the brake status.

The advantage of monitoring the brake pad wear through use of a sensor is that it generally facilitates the process of monitoring the disc brake. Additionally, a measure of the brake wear is obtainable without removal of the wheels and the disc brake for inspection. A further advantage of the brake monitoring system is that it can be installed without interfering with the integrity of already-installed certified brake components, for example.

The brake monitoring system can be used to monitor both the brake wear and the brake temperature simultaneously. Alternatively, by installing only certain sensors, the system can be operated in any of "wear only" and "temperature only" modes individually. The system is universal and can be used with any type of disc brakes that are installed on any type of vehicle, such as automobiles, trucks, trains, buses, subway cars, heavy equipment, aircraft, or any other vehicle that utilizes disc brakes. The brake monitoring system can also be configured to be used in combination with other sensor systems of the vehicle, and to thereby be used as a universal monitoring system for a variety of sensor data, for example trailer door open/closed status, refrigerator operational status, cargo temperature, etc. A record of dates and times of coded trailer connections and drop offs can also be recorded and saved to a memory card to aid companies in fleet management. The system allows optimized maintenance scheduling to reduce overall operational expenses, and may decrease the risk of costly and possibly catastrophic failure of vehicle's brake system.

BRIEF DESCRIPTION OF THE DRAWINGS

Embodiments will now be described more fully with reference to the accompanying drawings in which:

FIG. 13b is a perspective view of a controller board for the display module of FIG. 13a;

FIGS. 14a, 14b and 14c are front views of the "menu", "wear" and "temperature" screens, respectively, presented by the display module of FIG. 13a;

DETAILED DESCRIPTION OF THE EMBODIMENTS

The brake monitoring system described herein makes use of a sensor for detecting relative movement of a brake wear indicator during brake operation. Processing structure processes output of the sensor to determine brake assembly status. One or more temperature sensors are placed in proximity to the brake assembly to acquire brake temperature data. When used in combination with brake wear data, the brake temperature data can provide indication of additional problems that would otherwise be undetectable by monitoring the wear indicator alone.

The wear indicator and temperature sensors communicate with an axle module positioned on a vehicle axle. The axle module is hard wired or is wirelessly networked with other axle modules, and the axle modules are in communication with the processing structure. The processing structure compares wear indicator sensor data to previous wear indicator sensor data stored in memory to calculate values of brake wear, and displays these values together with the temperature data in real-time. The processing structure drives a touch screen to provide user-friendly interactive access to the data.

Embodiments of the brake monitoring system are hereafter described with reference to FIGS. 1 to 19.

Figure 1:
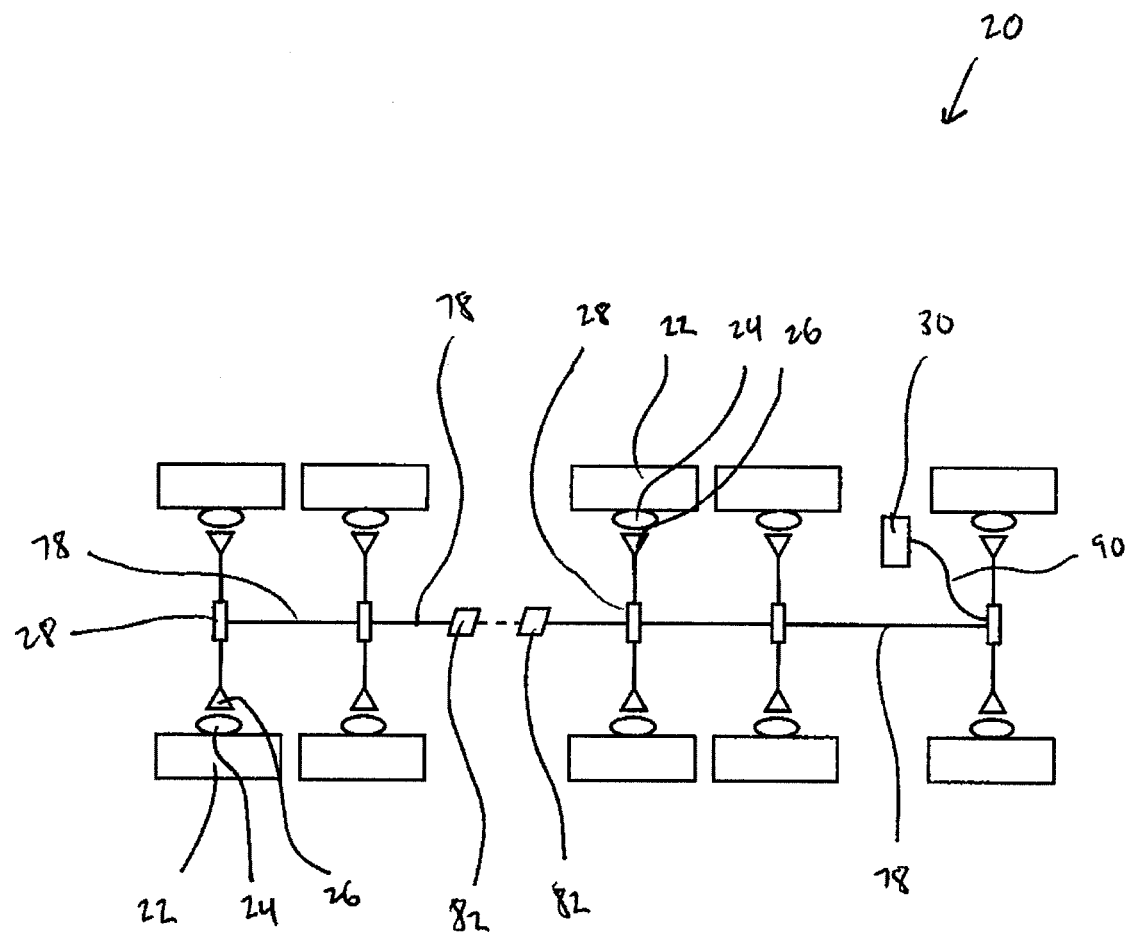
FIG. 1 is a schematic diagram of a braking system for a truck and a brake monitoring system for use therewith.

Highway transport vehicles, such as for example tractor-trailer trucks, comprise a tractor carrying a cab and one or more trailers connected to the tractor. FIG. 1 is a schematic diagram of a braking system, generally indicated by reference numeral 20, for a truck and a brake monitoring system for use therewith. As can be seen, the tractor-trailer truck comprises a tractor having three axles and a trailer having two axles. Each axle supports a plurality of wheels 22. Brake assemblies 24 are provided on the axles adjacent the wheels 22 to provide braking force to the wheels 22. System 20 comprises a plurality of brake monitoring apparatuses 26 that acquire sensor data from each brake assembly 24. This sensor data is communicated to an axle module 28 associated with each axle. The axle modules 28 are in communication with each other via communication cables 78, and are also in communication with a display module 30 having processing structure for processing the sensor data acquired by the brake monitoring apparatuses 26 for display. The display module 30 is also in communication with memory (not shown) and with a data logger (not shown), both of which comprise memory for the storage of the sensor data acquired by brake monitoring apparatuses 26. Display module 30 is also in communication with a display screen 32 for displaying the status of brake assemblies 24, or other information based on the data acquired by the brake monitoring apparatuses 26, to the driver of the truck.

Figure 2:
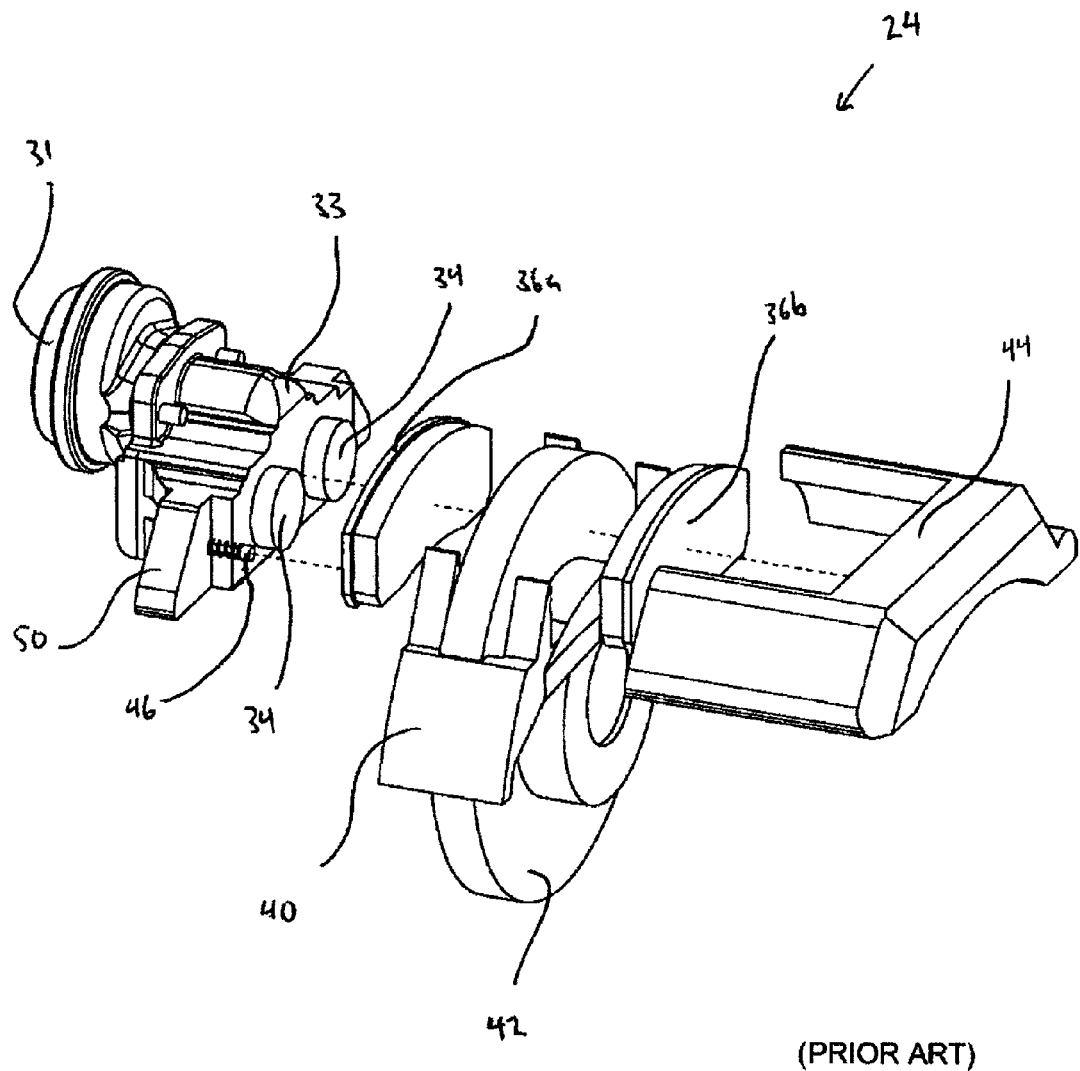
FIG. 2 is an exploded side perspective view of a conventional brake assembly.
Figure 3:
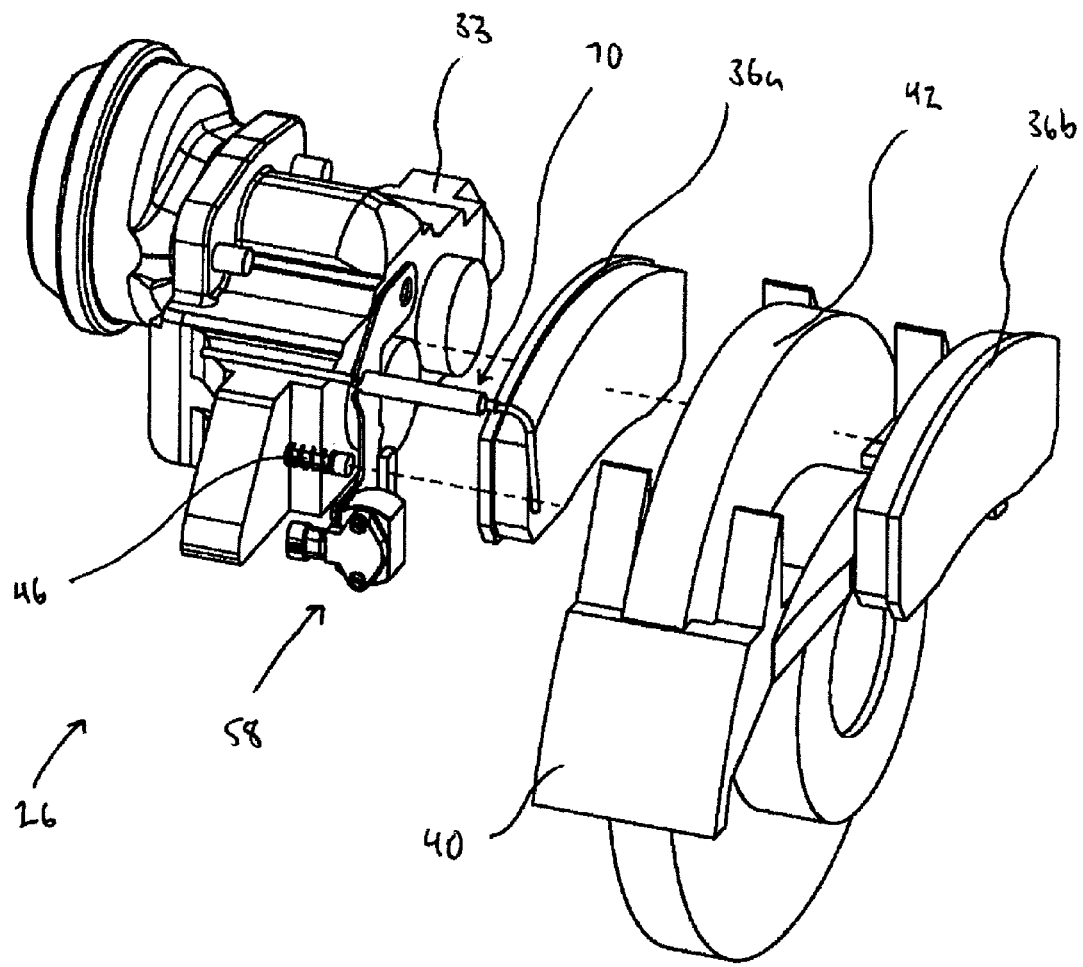
FIG. 3 is an exploded side perspective view of a conventional brake assembly, and showing a brake monitoring apparatus for use therewith forming part of the brake monitoring system of FIG. 1.
Figure 4:
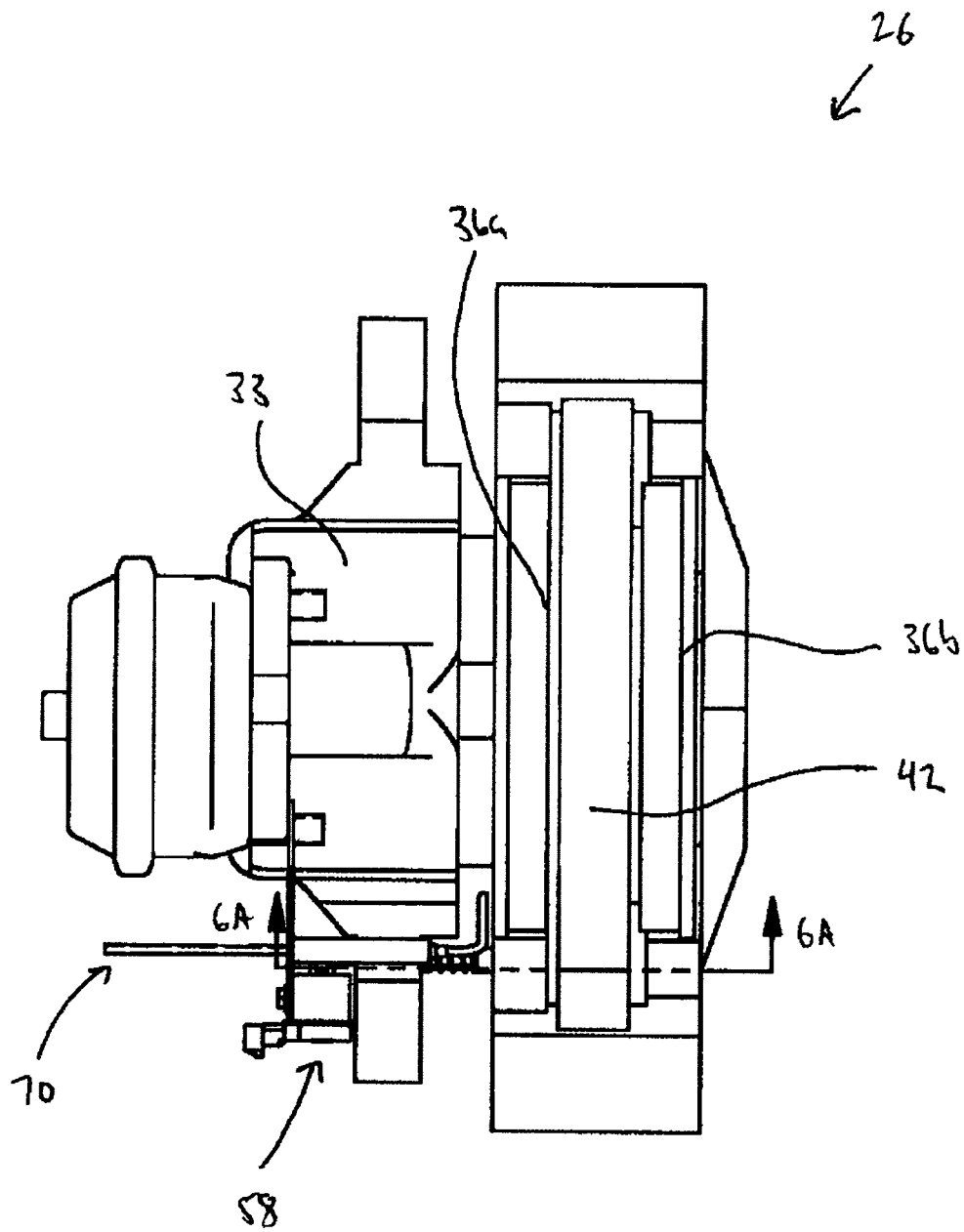
FIG. 4 is a top view of the brake monitoring apparatus of FIG. 3.
Figure 5A:
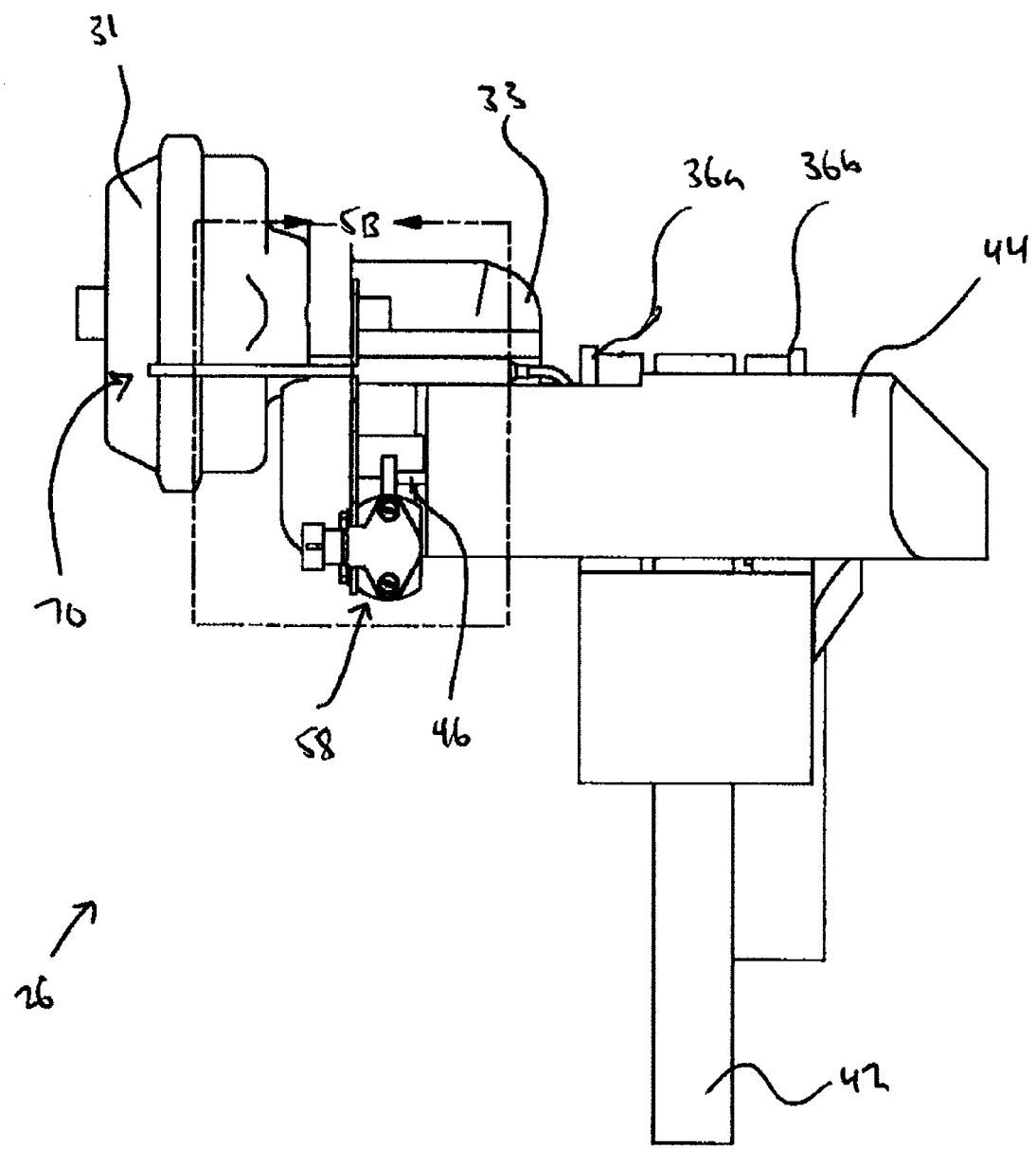
FIGS. 5a and 5b are side and enlarged side views, respectively, of the brake monitoring apparatus of FIG. 3.
Figure 5B:
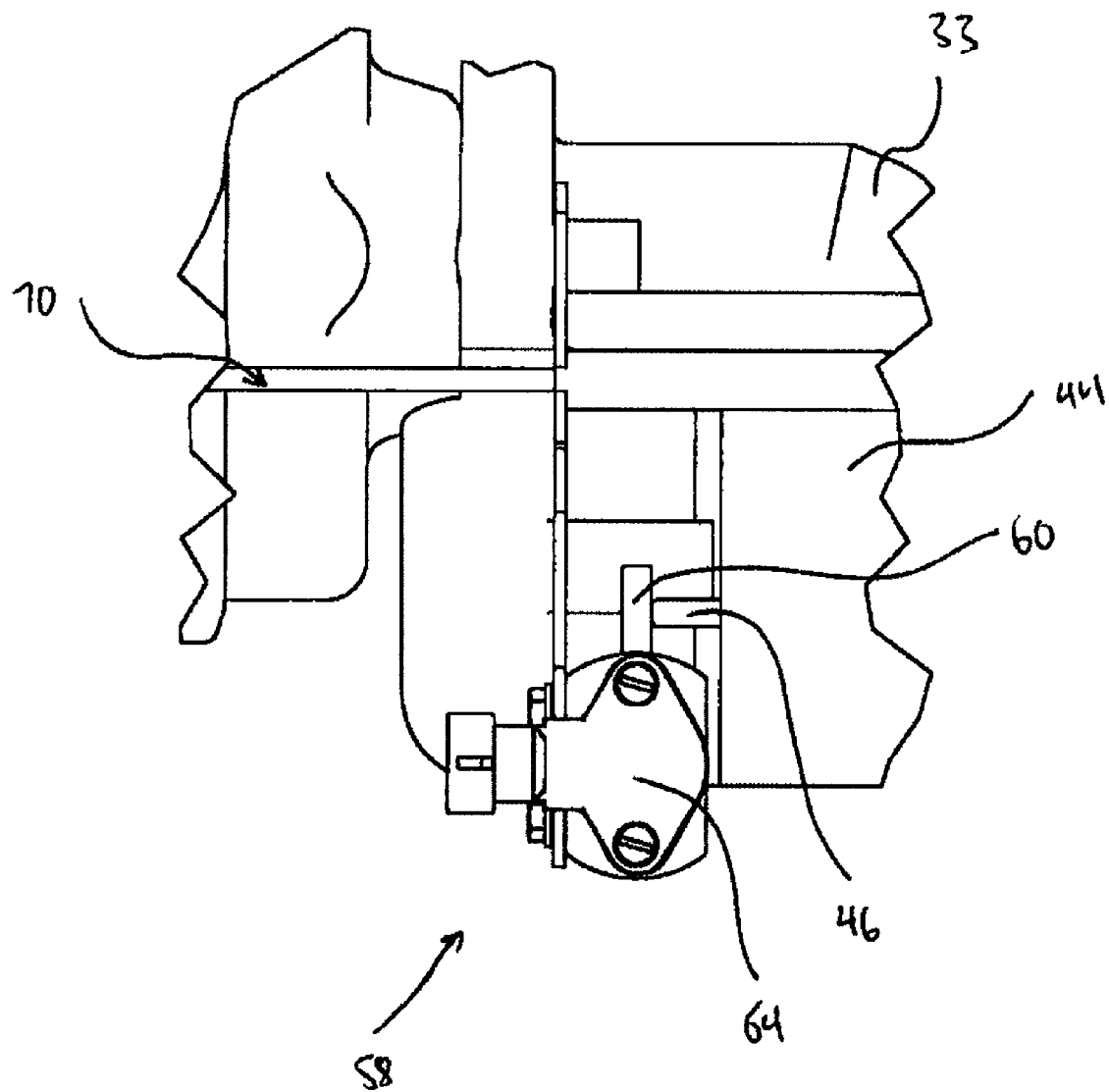
Figure 6A:
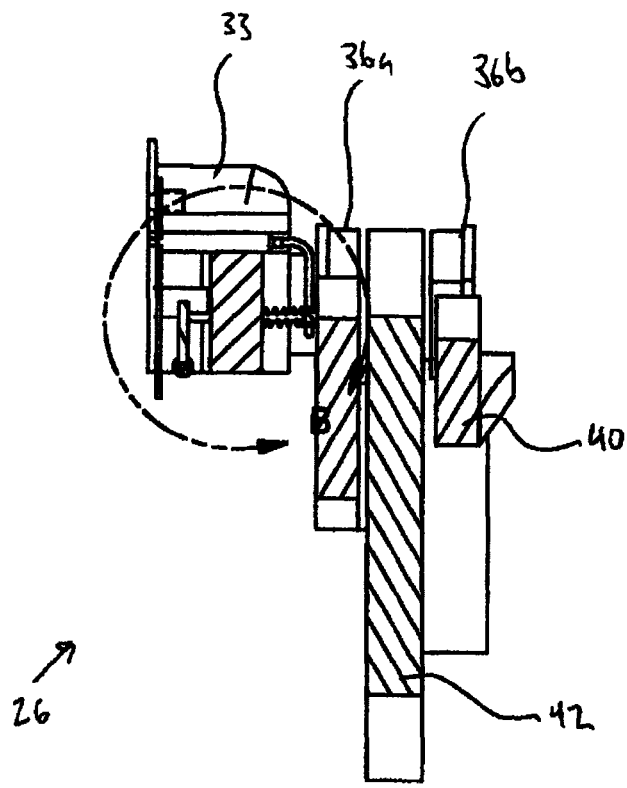
FIGS. 6a and 6b are side and enlarged side cross section views, respectively, of the brake monitoring apparatus of FIG. 3 and taken along the section line indicated in that Figure.
Figure 6B:
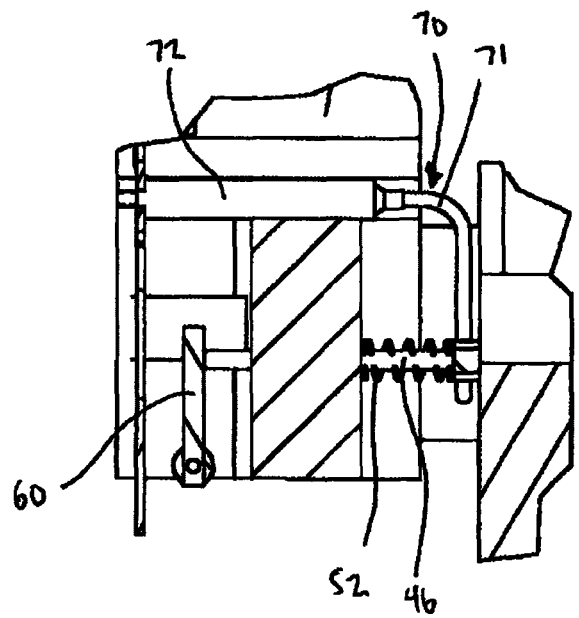
Figure 7:
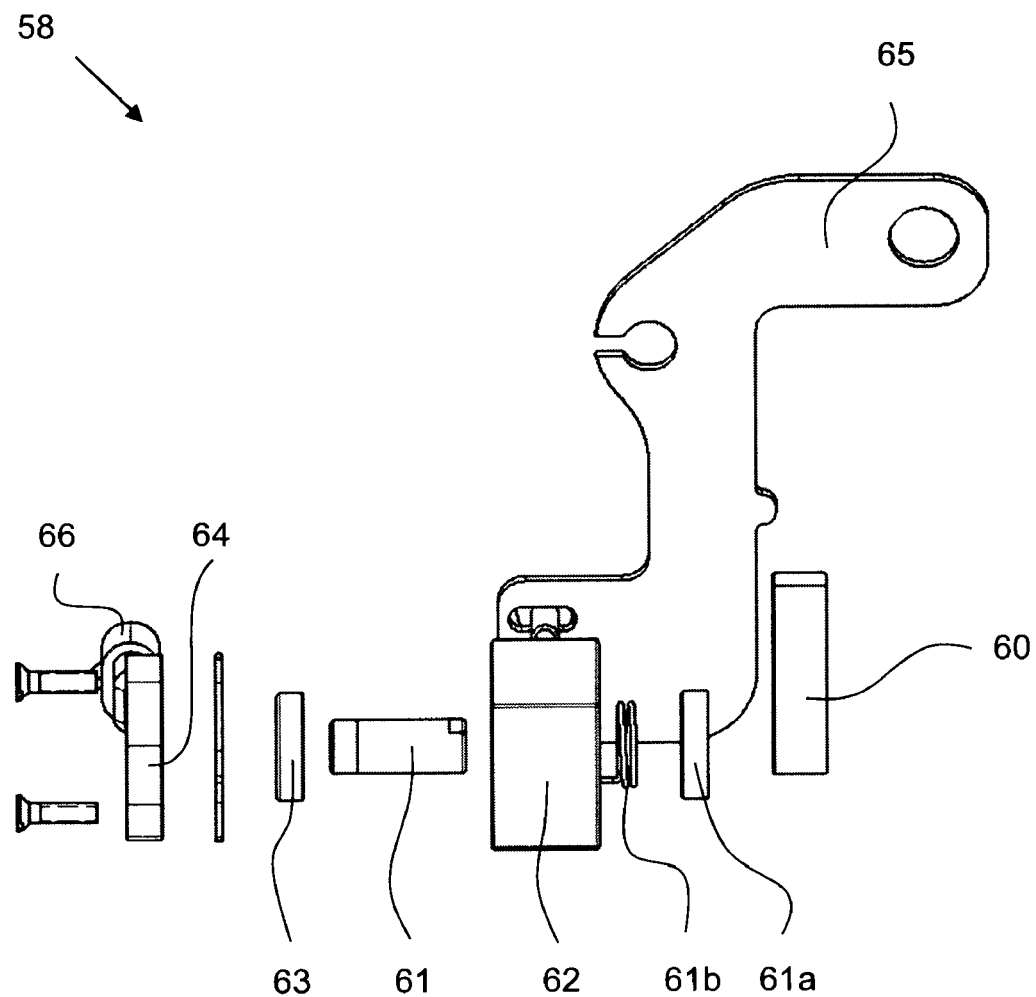
FIG. 7 is an exploded perspective view of a sensor assembly for use with the brake monitoring apparatus of FIG. 3.

FIG. 2 shows one of the brake assemblies 24. Brake assembly 24 is a conventional disc brake. The interrelation of the constituent parts of brake assembly 24, as is known in the art, is clearly illustrated. Brake assembly 24 comprises an air chamber 31 containing a volume of pressurized air which, upon application of the brake pedal (not shown), applies pressure against a movable diaphragm (not shown) connected to a push rod (not shown). The push rod is oriented to move within caliper housing 33 in a direction normal to the diaphragm. The push rod is coupled through an internal mechanism (not shown) within caliper housing 33 to a pair of moveable pistons 34 protruding from caliper housing 33. A carrier 40 having brake pads 36a and 36b seated therein is positioned adjacent caliper housing. Brake pad 36a is moveable and is in intimate contact with pistons 34. Carrier 40 is generally centered over a disc rotor 42 mounted to its respective axle of the vehicle, and such that brake pads 36a and 36b are situated on opposing sides of disc rotor 42. A bridge 44 partially encloses carrier 40, and is secured to caliper housing 33.

In this embodiment, brake assembly 24 has a moveable wear indicator pin 46 positioned within a longitudinal aperture 48 through an exterior flange 50 of the caliper housing 33. Wear indicator pin 46 is generally connected to caliper housing 33 by a biasing member 52. Here, biasing member 52 urges the wear indicator pin 46 in a direction away from caliper housing 33 and towards carrier 40, and such that one end of wear indicator pin 46 is urged against and contacts an outer surface of carrier 40 when the brake assembly 24 is in an assembled state.

During operation of brake assembly 24, an application of pressure from air chamber 31 causes pistons 34 to extend from caliper housing 33, which in turn pushes brake pad 36a against disc rotor 42 to make frictional contact and thereby generate a braking force. Brake pad 36a in turn displaces disc rotor 42 towards brake pad 36b, which returns an equal and opposite force by virtue of the connection of bridge 44 to caliper housing 33, and thereby provides frictional contact against disc rotor 42 so as to contribute to the braking force. During this movement, biasing member 52 urges wear indicator pin 46 to move with carrier 40, and in such a manner that first end 54 maintains contact with an outer surface of carrier 40 during this movement. Upon release of pressure from air chamber 31, pistons 34 retract back to their initial positions and brake pad 36a backs off of disc rotor 42 accordingly. At the same time, carrier 40 returns to its initial position, causing brake pad 36b to back off of disc rotor 42. The movement of carrier 40 in turn pushes wear indicator pin 46 back towards caliper housing 33.

FIGS. 3 to 8 better illustrate the brake monitoring apparatus 26 and its relationship to brake assembly 24, onto which it is fitted. In this embodiment, brake monitoring apparatus 26 comprises a sensor assembly 58 that is mounted to caliper housing 33, and which is configured to monitor the relative position of wear indicator pin 46.

Figure 8A:
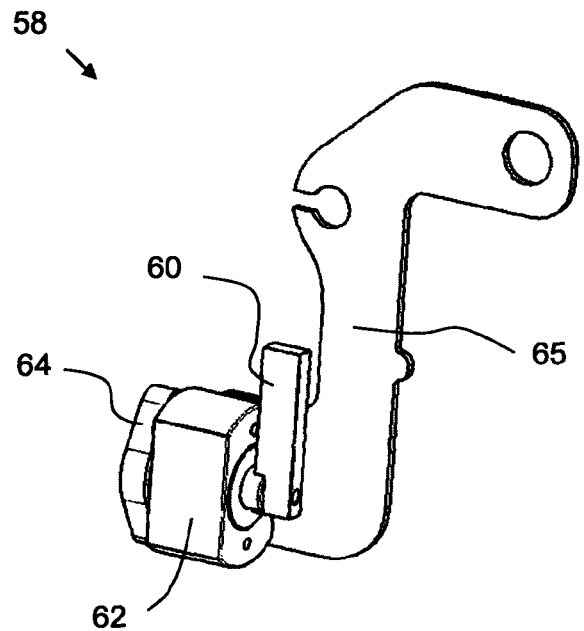
FIGS. 8a and 8b are front and rear perspective views of the sensor assembly of FIG. 7.
Figure 8B:
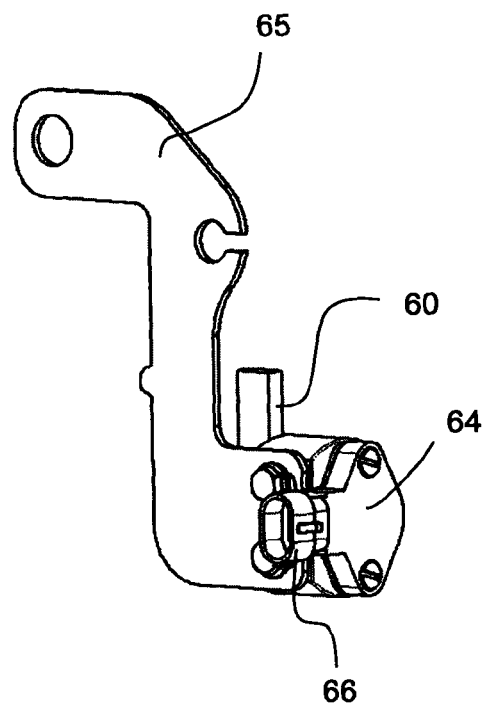

As may be more clearly seen in FIGS. 7a, 7b and 8, sensor assembly 58 comprises a rotatable paddle 60 that has a free end contacting second end 56 of wear indicator pin 46. Paddle 60 is configured to rotate around an axis defined by a sensor shaft 61 that is housed within a sensor shaft housing 62. Sensor shaft housing 62 houses a bearing seal 61a and a torsion spring 61b, which applies a bias to paddle 60 in a direction towards wear indicator pin 46. Sensor shaft 61 has a sensor magnet 63 affixed thereto and enclosed within sensor shaft housing 62. In this embodiment, sensor magnet 63 is a diametrically magnetized disc magnet.

Sensor shaft housing 62 has a rotary sensor 64 fastened to its exterior. In this embodiment, rotary sensor 64 is a non-contact rotary sensor that is capable of remotely sensing 360° of rotation of sensor magnet 63 as it moves relative to rotary sensor 64 in response to movement of the paddle 60 and the sensor shaft 61. As can be seen, rotary sensor 64 also comprises a connector 66 for communication of sensor data to a respective axle module 28.

Sensor shaft housing 62 is affixed to a sensor assembly bracket 65 using a fastener, as illustrated. Sensor assembly bracket 65 has an aperture that allows the sensor assembly 58 to be mounted to an exterior of the caliper housing 33 using one or more fasteners.

Accordingly, in this embodiment, the sensor assembly 58 is therefore configured to detect the relative position of a longitudinal member contacting the brake pad carrier 40, whereby the longitudinal member is wear indicator pin 46.

In this embodiment, the brake monitoring apparatus 26 also includes a temperature sensor, which is generally indicated by reference numeral 70. In the embodiment shown, temperature sensor 70 is a resistance temperature detector (RTD) manufactured by Intempco™ of Montreal, Quebec, Canada, and comprises a stainless steel sheath 71 encapsulating an RTD element. Sheath 71 is angled to provide ease of installation and to allow the RTD element to be positioned proximate the brake pad 36a. A sleeve 72 is affixed to sheath 71 for in turn enabling temperature sensor 70 to be detachably fitted to aperture 73 of sensor assembly bracket 65. Wiring connecting the RTD element of temperature sensor 70 to a connector 74 (not shown) is encapsulated in a stainless steel armoured sheath (not shown).

Figure 9:
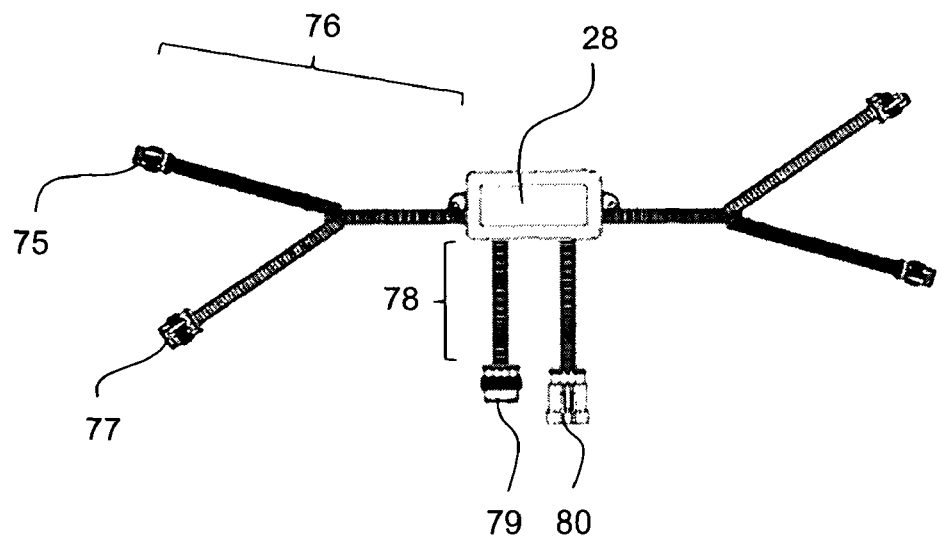
FIG. 9 is a plan view of an axle module for use with the brake monitoring system of FIG. 1.

As previously described, each brake monitoring apparatus 26 provides sensor data to a respective axle module 28 via sensor cable 76. An exemplary axle module 28 is illustrated in FIG. 9. In this embodiment, each sensor cable 76 comprises connectors 75 and 77 for electronically engaging with connectors 66 and 74 of respective ones of the rotary sensor 64 and the temperature sensor 70. Axle module 28 also comprises two communication cables 78 terminated by connectors 79 and 80 respectively. Communication cables 78 and connectors 79 and 80 enable the axle module 28 to engage in data communications with other axle modules 28 on adjacent axles, with wireless transceivers 82, or with processing structure located within the display module 30, thereby enabling sensor data acquired by each brake monitoring apparatus 26 to be communicated to the display module 30.

Figure 10:
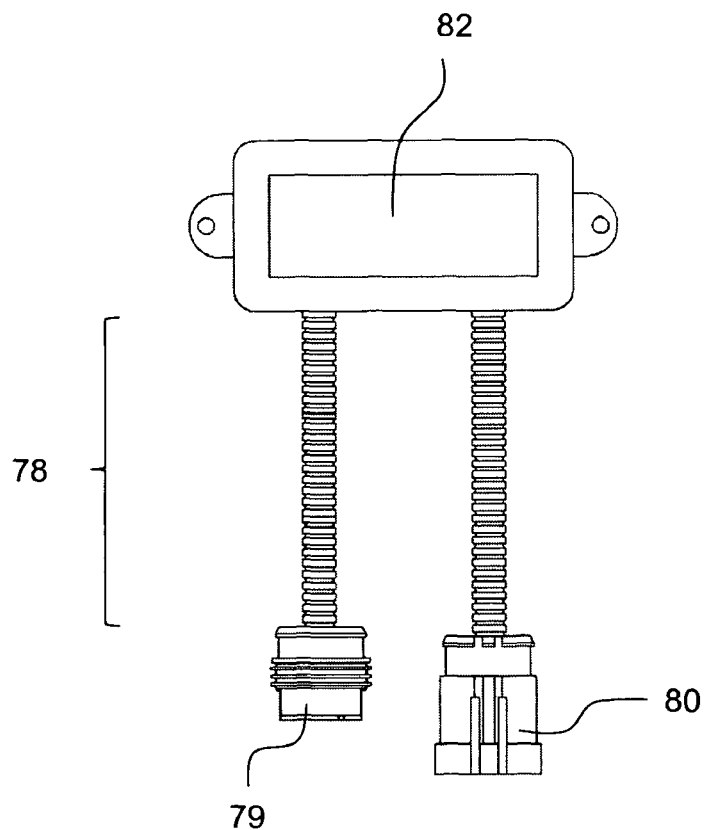
FIG. 10 is a plan view of a transceiver module for use with the brake monitoring system of FIG. 1.

Wireless transceiver 82 is used for the wireless communication of sensor data between the trailer and the tractor as shown in FIG. 10. In the embodiment shown, transceiver 82 comprises two of the communication cables 78 respectively equipped with the connector 79 and the connector 80, for the communication of sensor data between axle modules 28 located on the axles of the trailer and axle modules 28 located on the axles of the tractor. In this embodiment, communication between the trailer and the tractor is wireless, but it will be appreciated that this communication may alternatively be wired.

Figure 11:
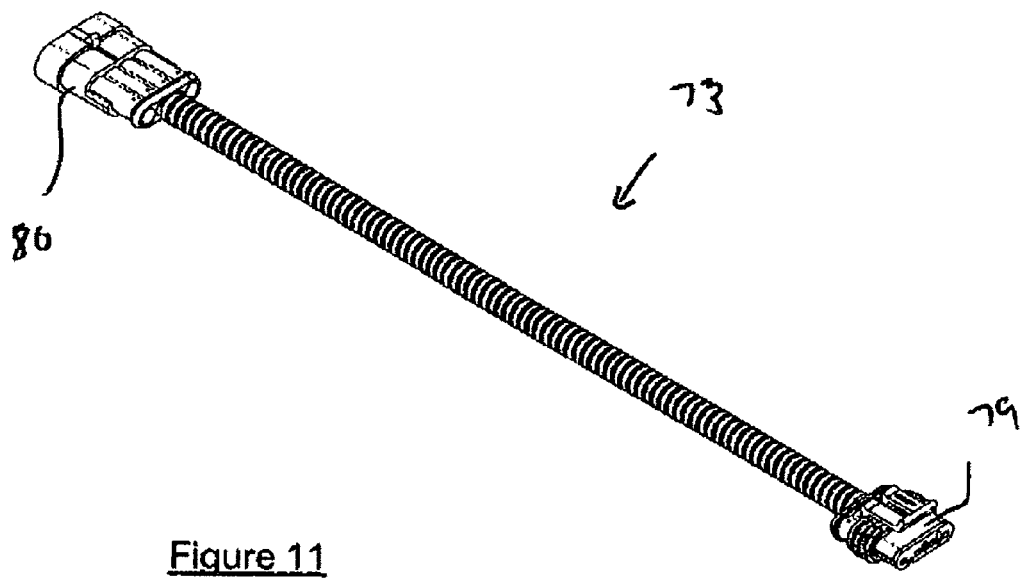
FIG. 11 is a perspective view of a communication cable for use with the brake monitoring system of FIG. 1.

FIG. 11 better illustrates communication cable 78. Communication cable 78 is terminated by the connector 79 at one end and the connector 80 at the other end. In the embodiment shown, communication cable 78 is a 4-conductor cable, and connectors 79 and 80 are four-position Super Seal™ connectors, with connector 79 being a female connector and connector 80 being a male connector. Those of skill in the art will appreciate that the cable and connectors need not be limited to the specific types shown, provided that they function to convey data as described.

Figure 12:
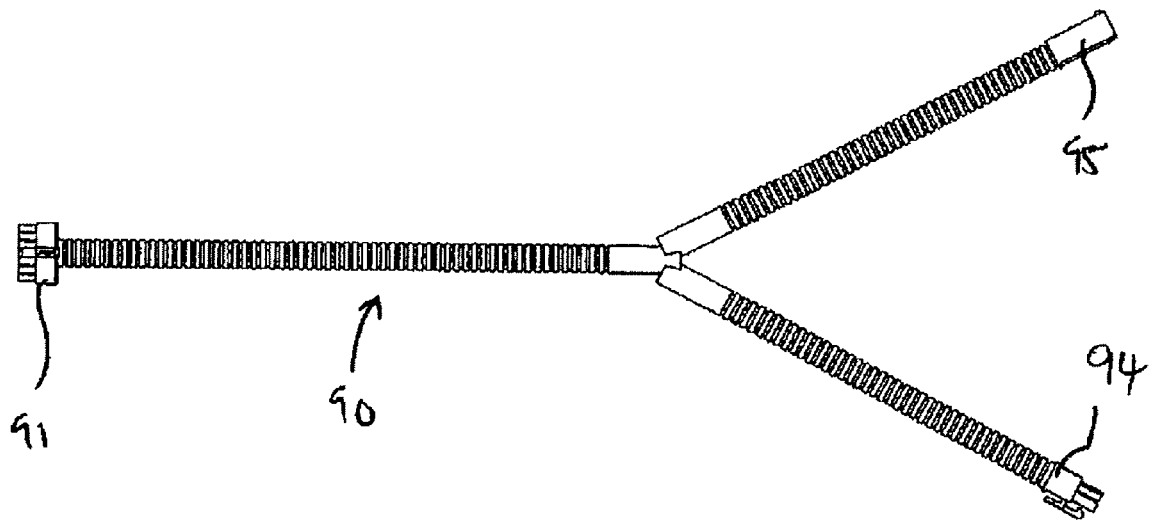
FIG. 12 is a plan view of a display communication cable for use with the brake monitoring system of FIG. 1.

FIG. 12 shows a display communication cable 90, which connects an axle module 28 to display module 30 through a communication port 93. Here, the communication port 93 is located on a motherboard 84 that supports the processing structure. In this embodiment, display communication cable 90 comprises a connector 91 for engaging a cable communicating with the axle module 28, and a connector 94 for engaging the communication port 93 of the display module 30. Communication cable 90 also comprises a connector 95 for connecting display module 30 to a power source.

Figure 13A:
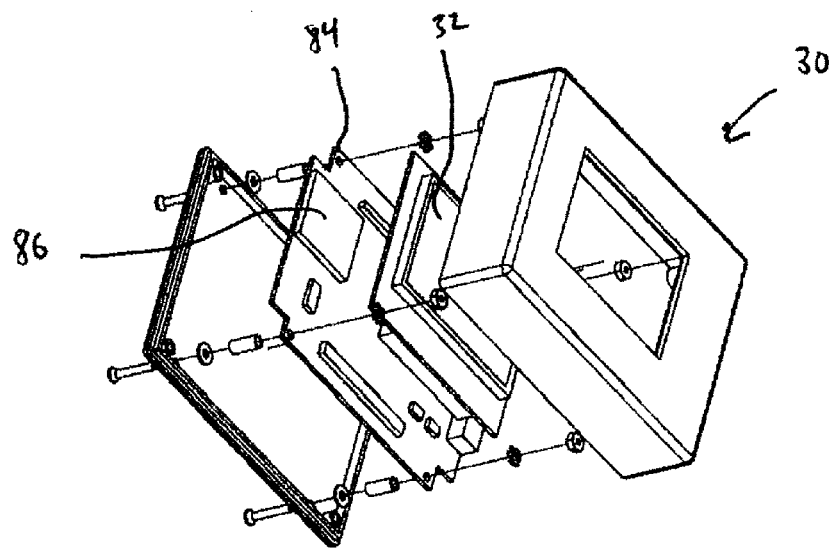
FIG. 13a is an exploded perspective view of a display module for use with the brake monitoring system of FIG. 1.
Figure 13B:
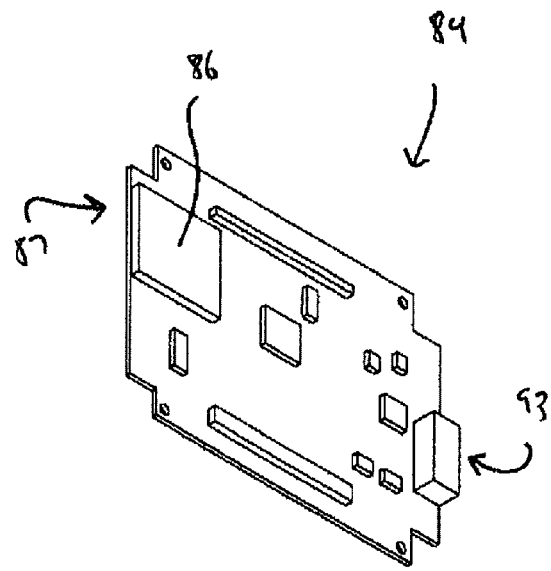

FIGS. 13a and 13b better illustrate the display module 30. Display module 30 comprises the motherboard 84 supporting the processing structure for processing the sensor data acquired by brake monitoring apparatuses 26, and provided to the processing structure via the communication port 93. The processing structure comprises a Digital Signal Processor ("DSP"). Other suitable processing devices may alternatively be employed. Display module 30 is also in communication with a data logger 86 that comprises electronic memory for the storage of data acquired by the brake monitoring apparatuses 26. In this embodiment, data logger 86 is a removable memory card that can be removably connected to a connector slot 87 of motherboard 84. Also connected to the components on motherboard 84 is the display screen 32. In this embodiment, display screen 32 is an interactive touch screen, which permits the driver of the vehicle to select from a number of display options presented on display screen 32 with a pointer such as a finger.

Figure 14A:
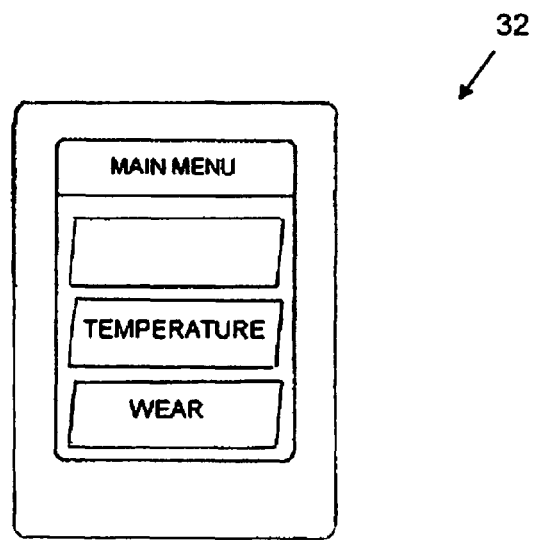
Figures 14B, 14C:
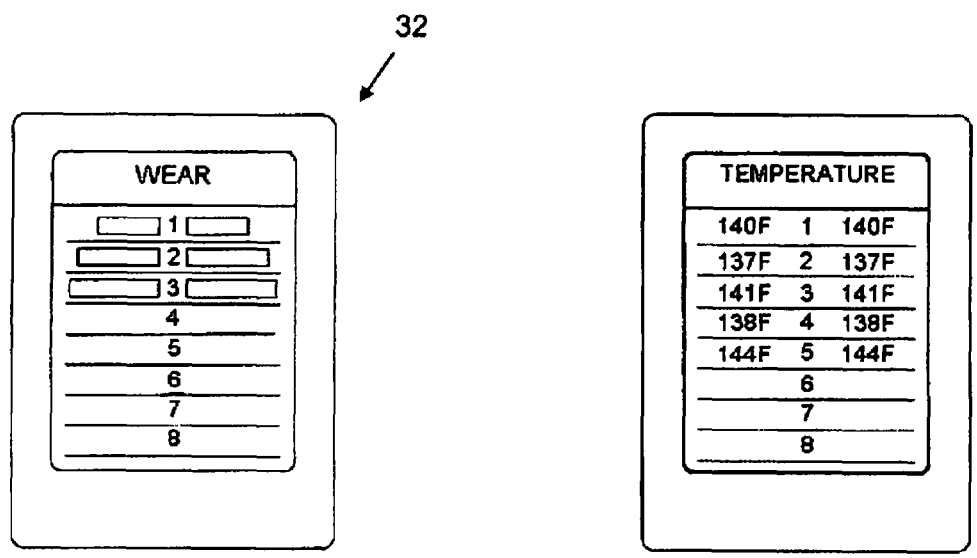

FIGS. 14a to 14c show embodiments of display screens presented by an application program running on the processing structure from non-volatile memory for use with the brake monitoring system 20. FIG. 14a shows the display screen 32 displaying a "menu screen". This screen allows the driver to view a variety of data by selecting from the displayed choices of "wear" and "temperature". FIG. 14b shows a "wear" screen, which is displayed upon selection of a "wear" virtual button shown in FIG. 14a. The "wear" screen displays brake wear quantitatively as a percentage, as a colour-coded horizontal bar, or as both, with the colour and length of the bar being representative of the wear percentage, based on the programmable limits. In this embodiment, a percentage of 100% corresponds to an angular rotation of paddle 60 by 39 degrees. As is known in the art, brake pad wear is related to the length of the wear indicator pin 46 that protrudes from the caliper housing 33. As the brake pads gradually wear, the length of the wear indicator pin 46 protruding from the caliper housing 33 decreases. FIG. 14c shows a "temperature" screen, which is displayed upon selection of a "temperature" virtual button shown in FIG. 14a. The "temperature" screen displays the temperature of each brake. The units of temperature displayed (Celsius or Fahrenheit) may be selected by the driver. As the programmable temperature limits are approached, the numbers change colour from green to yellow to red. As will be appreciated, the interactive touch capability of display screen 32 allows the application to be user friendly, and is of a large size and color-coded such that any information displayed may be easily read by the driver at a glance.

Figure 15:
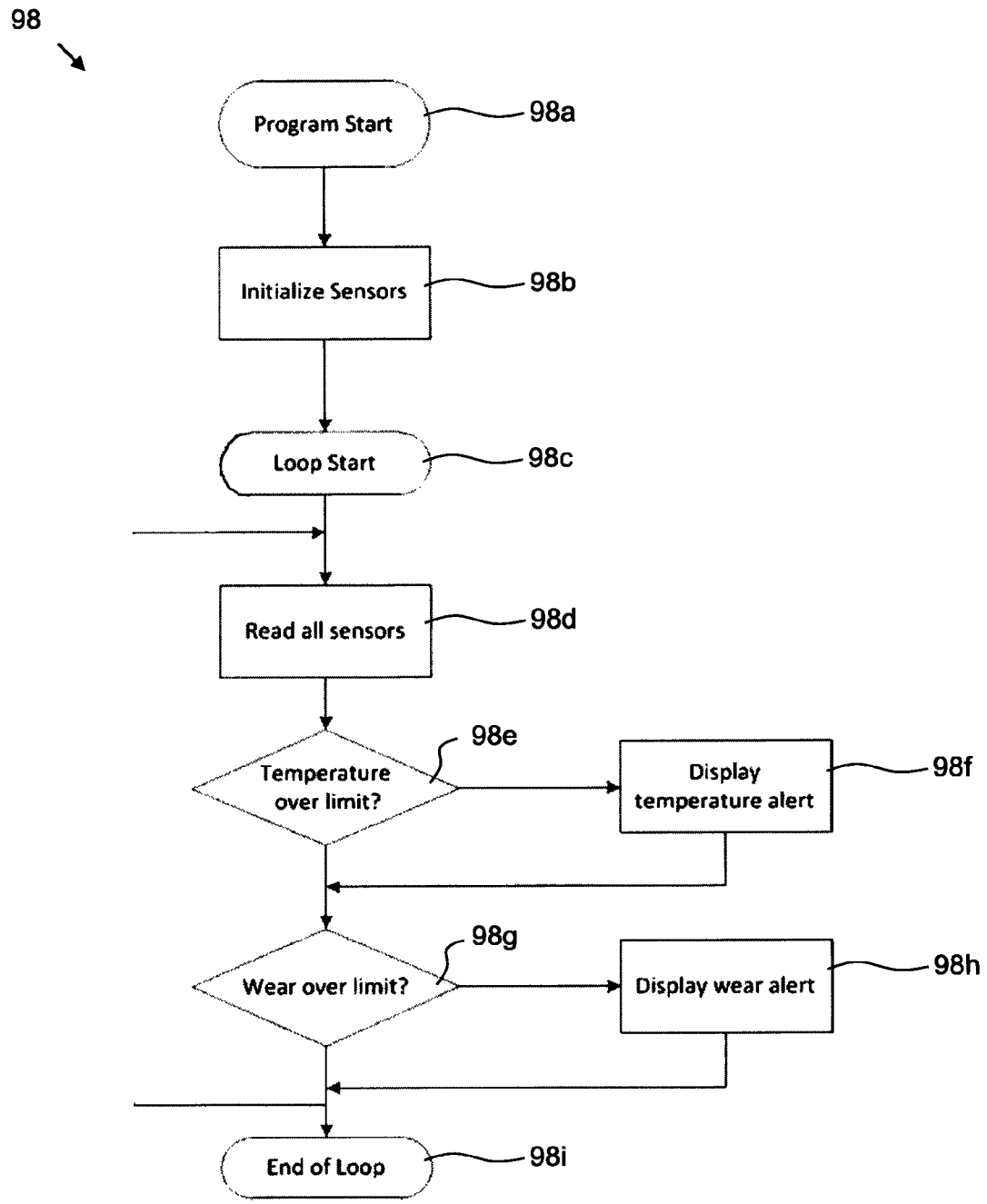
FIG. 15 is a flowchart providing an operational overview of the brake monitoring system of FIG. 1.
Figure 16:
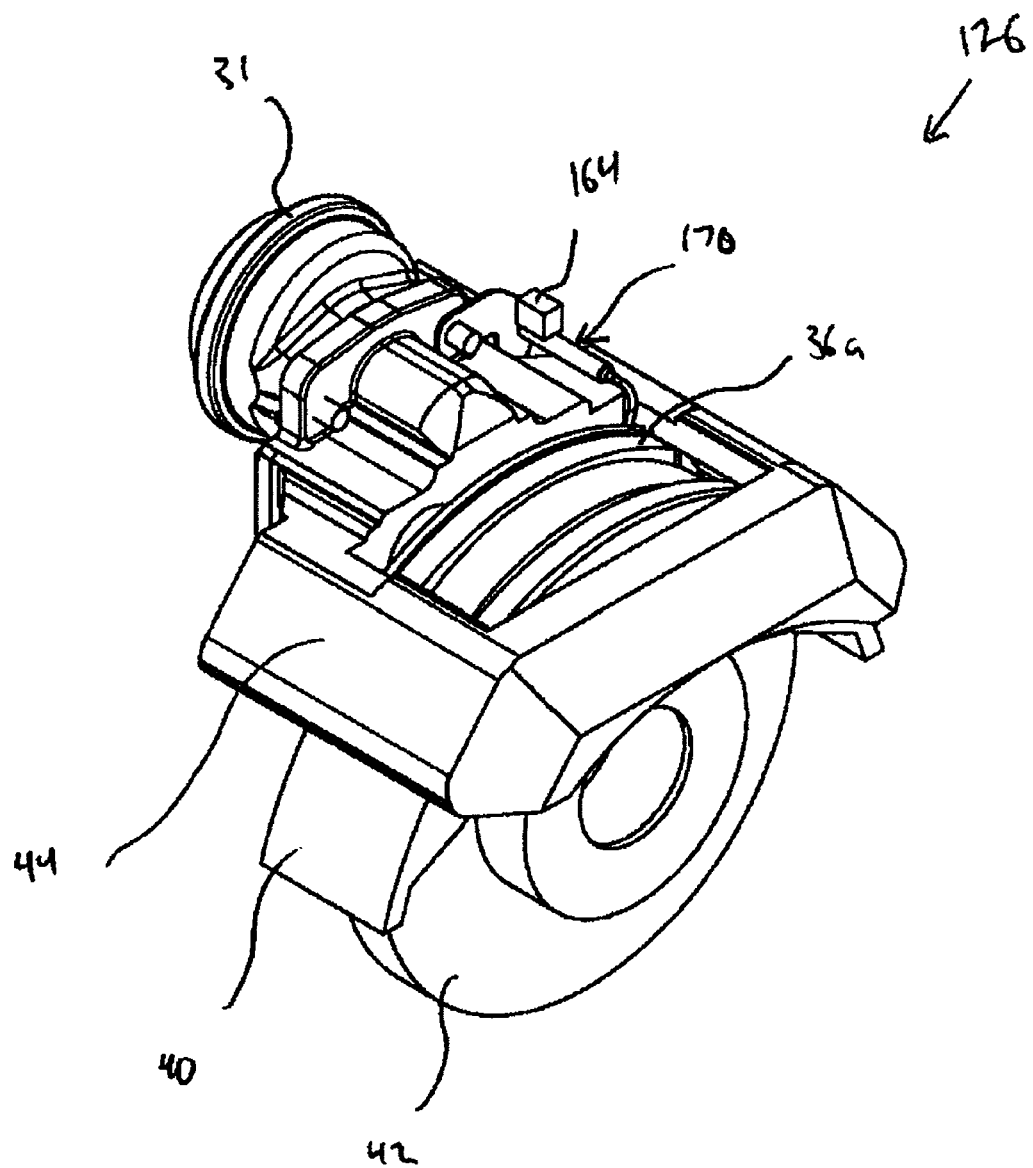
FIG. 16 is a perspective view of a conventional brake assembly, and showing another embodiment of a brake monitoring apparatus for use therewith forming part of the brake monitoring system of FIG. 1.
Figure 17:
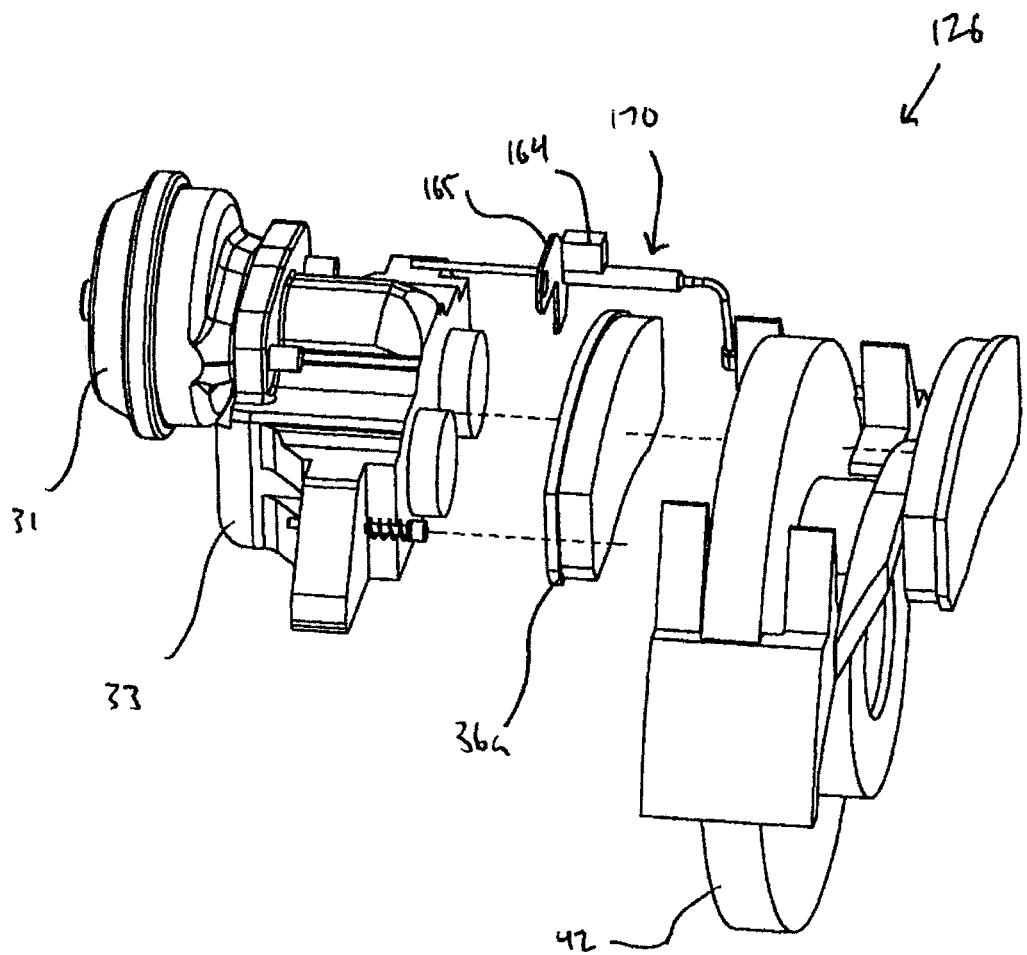
FIG. 17 is an exploded perspective view of the brake monitoring apparatus of FIG. 16.
Figure 18:
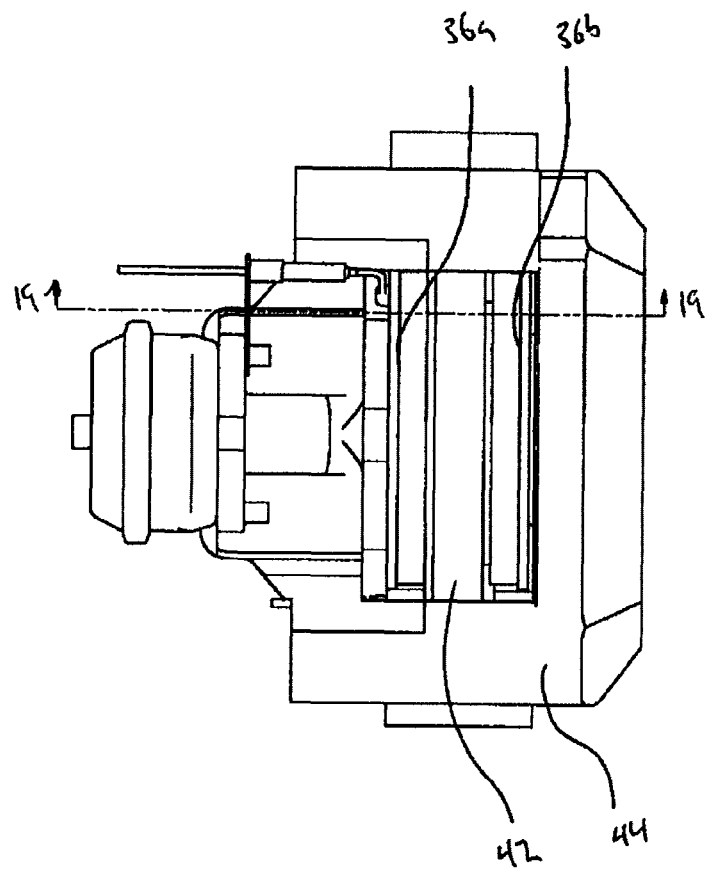
FIG. 18 is top plan view of the brake monitoring apparatus of FIG. 16.
Figure 19:
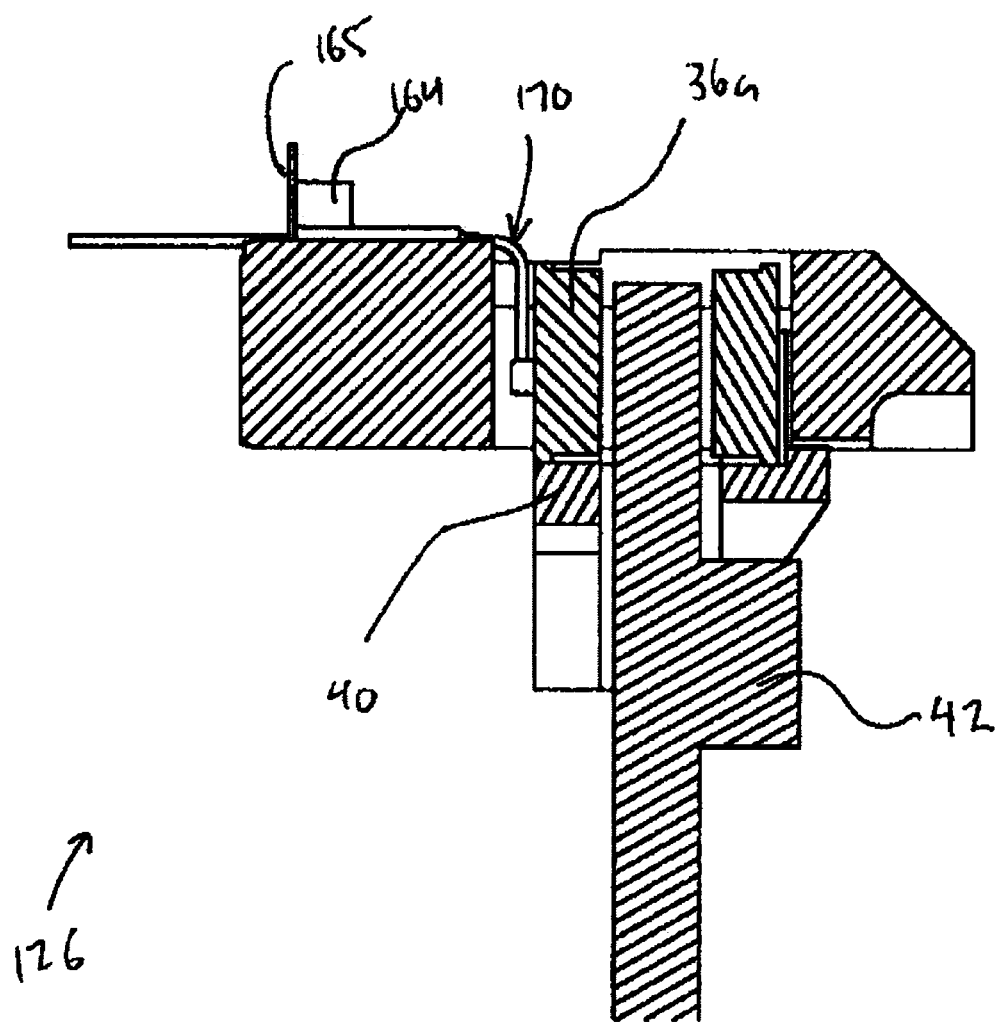
FIG. 19 is a cross-sectional side view of the brake monitoring apparatus of FIG. 16 taken along the section line indicated in FIG. 18.

FIG. 15 shows an overview of the steps in the method undertaken by the processing structure to analyze the acquired sensor data and display useful information, the method being generally indicated by reference numeral 98 and described below.

In operation, upon application of vehicle brakes by the driver, pistons extend from caliper housing 33, which cause brake pads 36a to press against rotator disc 42 and carrier 40 to be pushed away from caliper housing 33. Wear indicator pin 46 also moves away from caliper housing 33 in unison with carrier 40. In turn, paddle 60 of sensor assembly 58 rotates as wear indicator pin 46 moves, and in turn rotates both the sensor shaft 61 and the sensor magnet 63 affixed thereto. This rotation of sensor magnet is detected by rotary sensor 64, which continuously acquires relative rotational position data and communicates it to axle module 28. Temperature data of the brake assembly is also continuously acquired by temperature sensor 70 and communicated to axle module 28. Both relative rotational position data and temperature data are in turn communicated by axle module 28 to display module 30 by way of communication cables 78, axle modules 28, and transceivers 82, as described above.

The processing structure of display module 30 processes the temperature data to assess the temperature conditions of brake assembly 24. Here, the measured temperature value is compared to a temperature limit value stored in memory of display module 30 (step 98e). If the temperature limit value is exceeded by the measured temperature value, an alarm condition is displayed (step 98f). Otherwise, the temperature is displayed numerically graphically on the "temperature" screen of display module 30, as illustrated in FIG. 14c.

The wear is calculated using the paddle rotation, and in particular the rotational movement of sensor magnet 63 on sensor shaft 61 relative to rotary sensor 64 of sensor assembly 58. This measured value of paddle rotation is compared to a reference value of paddle rotation stored in memory of display module 30 (step 98g). In the event that the measured value is greater than the reference value, the difference is attributed to wear. If the limit is exceeded, an alarm condition is displayed on display module 30 (step 98h). Otherwise, the wear is displayed graphically on the "wear" screen of display module 30, as illustrated in FIG. 14b, in which the length of the horizontal bar corresponds to a percentage of wear. The processing structure of display module 30 records brake activity to the data logger 86 at predefined intervals.

FIGS. 16 to 19 show a brake assembly 24 to which is fitted another embodiment of a brake monitoring apparatus, generally indicated by reference numeral 126. In this embodiment, brake monitoring apparatus 126 comprises a sensor assembly 158 equipped with a linear sensor 164 that is configured to detect linear, relative movement of a moveable temperature sensor 170. Here, temperature sensor 170 has a tip that is generally in contact with a surface of carrier 40. In the embodiment shown, the tip of temperature sensor 170 is urged against carrier 40 by a biasing member (not shown) within sensor assembly 158. However those of skill in the art will appreciate that other configurations are possible. For example, the tip of temperature sensor 170 may be soldered or fused to carrier 40, or may be connected to carrier 40 via a connecting block, for example. Still other arrangements are possible.

During operation of brake assembly 24 fitted with brake monitoring assembly 126, an application of pressure from air chamber 31 causes pistons 34 to extend from caliper housing 33, which in turn pushes brake pad 36a against disc rotor 42 to make frictional contact and thereby generate a braking force. Brake pad 36a in turn displaces disc rotor 42 towards brake pad 36b, which returns an equal and opposite force by virtue of the connection of bridge 44 to caliper housing 33, and thereby provides frictional contact against disc rotor 42 so as to contribute to the braking force. During this movement, the biasing member (not shown) within sensor assembly 158 urges temperature sensor 170 to move with carrier 40, and in such a manner that the tip of temperature sensor 170 maintains contact with an outer surface of carrier 40 during this movement. Upon release of pressure from air chamber 31, pistons 34 retract back to their initial positions and brake pad 36a backs off of disc rotor 42 accordingly. At the same time, carrier 40 returns to its initial position, causing brake pad 36b to back off of disc rotor 42. The movement of carrier 40 pushes wear temperature sensor 170 back towards caliper housing 33.

Accordingly, in this embodiment, the sensor assembly 158 is therefore configured to detect the relative position of a longitudinal member contacting the brake pad carrier 40, whereby the longitudinal member is temperature sensor 170.

As will be appreciated, one advantage of the brake monitoring assemblies of the embodiments described above is that they may be readily attached to existing brake assemblies in a facile manner, and in such a way as not to interfere with the integrity of already-installed brake components, for example.

Although in embodiments described above, the brake monitoring system is used to process and display data acquired from the brake monitoring apparatuses, in other embodiments, the system may also process and display data acquired from non-brake related sensors on the vehicle, such as, but not limited to, cargo temperature, refrigerator operational status, and trailer door open/closed status. In another embodiment, the system can acquire and monitor data concerning the identity of the trailer, together with the time of identification, so as to create a chronological record of trailer connections to the tractor for the purpose of fleet accounting.

Although in embodiments described above the brake monitoring apparatus comprises one temperature sensor placed in thermal communication with the brake assembly, the apparatus may alternatively comprise any number of temperature sensors placed in thermal communication with the brake assembly.

Although in the embodiments described above the display module is in wired communication with the plurality of axle modules, in other embodiments, the display module may alternatively be in wireless communication with the plurality of axle modules through the transceivers.

In the embodiments described above, the data logger is a removable memory card. The removability of the memory card facilitates record keeping and the installation of software, and also enables the data logger to be readily used to provide proof of compliance for servicing and operational inspections. However, the data logger may alternatively be non-removable with respect to the motherboard.

Although in embodiments described above the brake monitoring system is configured to monitor wear and temperature of disc brake assemblies, in other embodiments, the brake monitoring system may be used with brake monitoring assemblies for other types of vehicle brakes. Such brake monitoring assembles are described, for example, in PCT Application No. WO 2010/003244, entitled "VEHICLE BRAKE MONITORING SYSTEM AND METHOD", filed on Jul. 10, 2009. In related embodiments, the display module may be configured to display "menu", "stroke", "temperature", and "wear" screens. In alternative related embodiments, the display module may be configured to display any screen for which data processed by the brake monitoring system is displayed. In other related embodiments, the display module is configured to display a "slack" screen in addition to "menu", "stroke", "temperature", and "wear" screens.

Although in embodiments described above the brake monitoring system is configured to monitor all of the brake assemblies of the vehicle, in other embodiments the system may be configured to monitor only a subset of the brake assemblies of the vehicle.

Although in embodiments described above the brake monitoring apparatus comprises a rotary sensor, in another embodiment the brake monitoring apparatus may comprise no rotary sensors and may instead only comprise temperature sensors for use with a brake monitoring system that operates in a "temperature only mode". In this embodiment, wear is calculated from energy developed in the brake shoes of the brake assembly, and the acquired temperature data is displayed, for example, as temperature as a function of time, from which brake assembly status may be determined and from which non-activating, hung or dragging brakes may be identified.

Although in embodiments described above the brake monitoring apparatus utilizes a rotary sensor for detecting a sensor magnet, and thus detects relative paddle motion magnetically, in other embodiments the brake monitoring apparatus detects relative paddle motion in another manner, such as for example optically, and whereby for example the sensor may comprise at least one light detector and the paddle may comprise a reflective surface configured for reflecting light detectable by the at least one light detector. In a related embodiment, the sensor may comprise at least one light detector and the indicator pin may comprise a reflective surface configured for reflecting light detectable by the at least one light detector.

In the embodiments described above, the temperature values recorded using the temperature sensors can be compared to ambient temperature for the purpose of determining safe or unsafe operating conditions. Ambient temperature is measured by a temperature sensor housed in each axle module. Alternatively, in other embodiments, the temperature of a given brake assembly is compared to that of the opposite brake assembly on the axle. Alternatively, ambient temperature may be subtracted from the brake assembly temperature, and monitored over multiple measurements to determine braking power developed per brake assembly. This braking power may be expressed as change in temperature/time, and such historical data can be used to infer brake wear, for example.

Although embodiments have been described above with reference to the accompanying drawings, those of skill in the art will appreciate that variations and modifications may be made without departing from the spirit and scope thereof as defined by the appended claims.

What is claimed is:
1. A vehicle brake monitoring system comprising:
a sensor assembly configured to detect, during vehicle braking, relative position of a wear indicator pin contacting a brake pad carrier, the sensor assembly including a paddle to rotate in response to longitudinal movement of the wear indicator pin, and a rotary sensor configured to detect rotation of the paddle; and
processing structure communicating with the sensor assembly, the processing structure processing output of the sensor assembly to determine brake status.

2. A system according to claim 1, further comprising at least one temperature sensor communicating with the processing structure and configured to measure temperature adjacent the brake.

3. A system according to claim 2, wherein the temperature sensor is a moveable temperature sensor and is configured to move linearly in response to movement of the carrier, the moveable temperature sensor serving as the wear indicator pin.

4. A system according to claim 3, wherein the sensor of the sensor assembly is a linear sensor.

5. A system according to claim 2, wherein the processing structure compares temperature sensor output to previous temperature sensor output to determine brake temperature.

6. A system according to claim 1, wherein the sensor assembly comprises at least one element that is displaced by the wear indicator min during braking, and at least one sensor configured to detect displacement of the element.

7. A system according to claim 1, wherein the processing structure compares sensor output to previous sensor output to determine brake wear.

8. A system according to claim 1, further comprising a display screen in communication with the processing structure.

9. A system according to claim 8, wherein the display screen is configured to display at least one of brake wear and brake temperature.

10. A vehicle brake monitoring apparatus comprising:
a sensor assembly comprising a sensor for detecting relative position of a wear indicator pin contacting a brake pad carrier, the sensor assembly including a paddle configured to rotate in response to movement of the wear indicator pin, and wherein the sensor is a rotary sensor configured to detect rotation of the paddle.

11. An apparatus according to claim 10, further comprising at least one element that is displaced by the wear indicator pin during braking.

12. An apparatus according to claim 10, further comprising at least one temperature sensor measuring temperature adjacent the brake.

13. An apparatus according to claim 12, wherein the temperature sensor is a moveable temperature sensor and is configured to move linearly in response to movement of the carrier, the moveable temperature sensor serving as the wear indicator pin.

14. An apparatus according to claim 13, wherein the sensor of the sensor assembly is a linear sensor.

15. An apparatus according to claim 10, wherein the sensor is configured to communicate with processing structure determining at least one of brake wear and brake temperature.

16. A method of monitoring a vehicle brake, the method comprising:
sensing at least one relative position of a wear indicator min contacting a brake pad carrier;
communicating the at least one relative position to processing structure; and
comparing the at least one relative position to previous relative position data to determine brake status, wherein the at least one relative position comprises a rotational position of a paddle configured to rotate relative to a rotary sensor and in response to movement of the wear indicator pin.

17. A method according to claim 16, further comprising:
sensing temperature adjacent the brake; and
communicating the temperature to the processing structure.

18. A method according to claim 16, further comprising:
displaying the brake status.

* * * * *